United States Patent [19]

Wubbe et al.

[11] 3,875,610

[45] Apr. 8, 1975

[54] ADJUSTABLE WINDSHIELD WIPER ARM

[75] Inventors: Leo J. Wubbe, Beverly Shores; William H. Harbison, Merrillville, both of Ind.

[73] Assignee: The Anderson Company, Gary, Ind.

[22] Filed: July 24, 1973

[21] Appl. No.: 382,276

[52] U.S. Cl. ............ 15/250.35; 15/250.32; 403/97
[51] Int. Cl. .............................................. B60s 1/40
[58] Field of Search....... 15/250.21, 250.23, 250.31, 15/250.34, 250.32, 250.35; 403/106, 109, 403/91, 146, 97

[56] References Cited
UNITED STATES PATENTS

| | | | |
|---|---|---|---|
| 2,312,278 | 2/1943 | Zaiger | 15/250.35 X |
| 2,642,612 | 6/1953 | Smulski | 15/250.23 |
| 2,676,821 | 4/1954 | Reichelderfer | 15/200.35 X |

FOREIGN PATENTS OR APPLICATIONS

| | | | |
|---|---|---|---|
| 566,714 | 1/1945 | United Kingdom | 15/250.35 |
| 616,958 | 1/1949 | United Kingdom | 15/250.35 |
| 639,744 | 7/1950 | United Kingdom | 15/250.35 |

*Primary Examiner*—Peter Feldman
*Attorney, Agent, or Firm*—Wegner, Stellman, McCord, Wiles & Wood

[57] ABSTRACT

An adjustable extension or tip is provided for a straight end windshield wiper arm. The adjustment is provided by a pair of mating serrated friction plates secured to the arm end and to the extension or tip such that the axis of the extension or tip can be angled in 4° increments to the axis of the wiper arm. One of the purposes for angling the extension or tip is to provide the proper park angle so that a wiper blade assembled on the arm will park parallel to the lower edge of the windshield of a vehicle. Another purpose for angling the extension or tip is to provide the most efficient wipe pattern on the windshield by having the longitudinal axis of the blade align with the flattest portions of the windshield.

2 Claims, 7 Drawing Figures

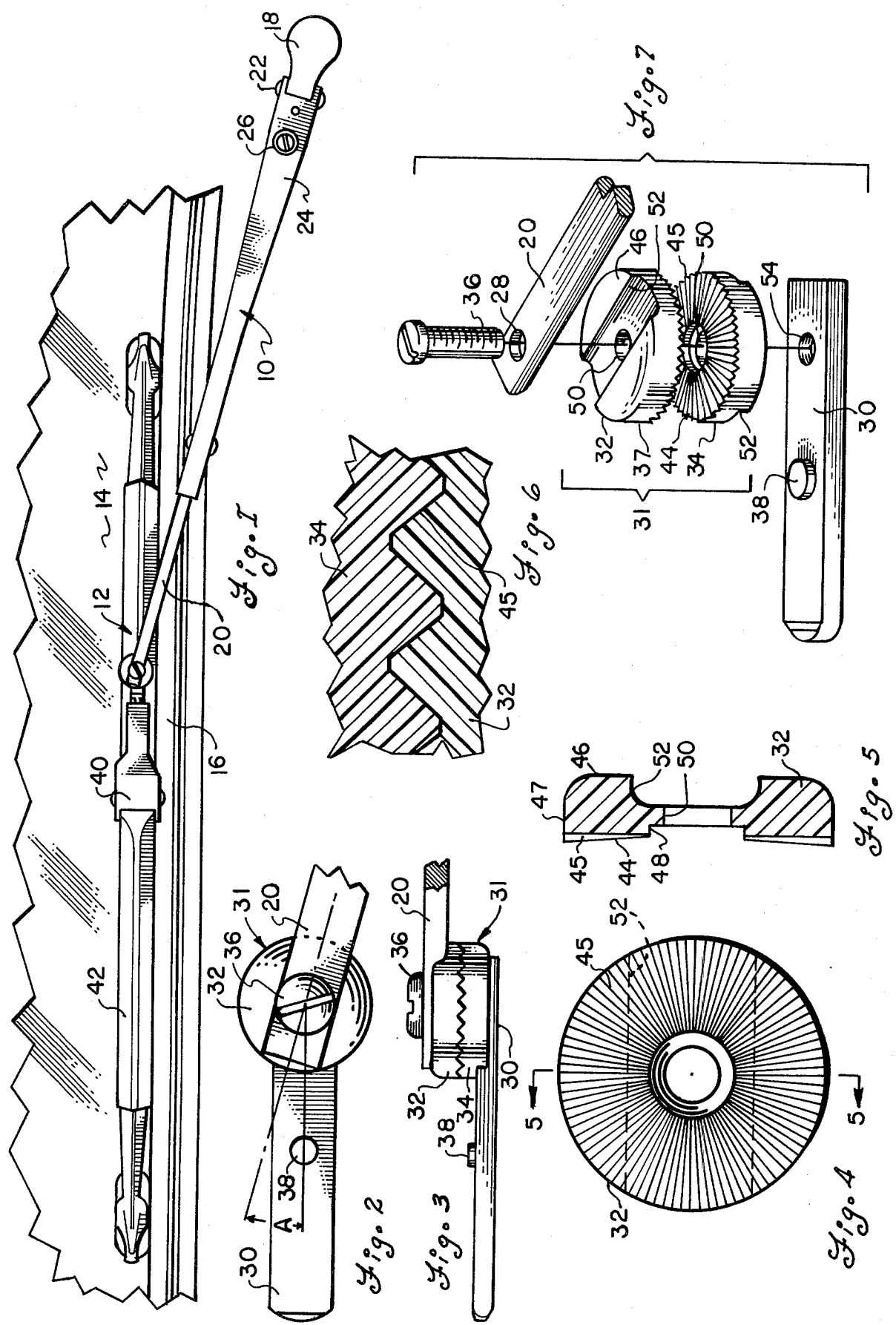

ADJUSTABLE WINDSHIELD WIPER ARM

BACKGROUND OF THE INVENTION

The present invention relates to windshield wiper arms for use on vehicles and more particularly for adjustable extensions or tips on arms being used for replacement of straight end wiper arms having tip end portions disposed at an angle to the longitudinal axis of the arm.

Ideally the pivot shafts for driving wiper arms and blades on windshields of automotive vehicles would be located close to the lower edge of the windshield so that the blades on the wiper arms would be parallel to the edge of the windshield in the parked position. Designers of automotive vehicles have provided locations of the pivot shafts spaced from the edge of the windshield such that in the park position the wiper blade is not parallel to the edge of the windshield unless the end portion of the wiper arm is angled with respect to the main portion of the arm. Many original equipment wiper arms and replacements therefore have the end portion of the arm formed at the desired angle to accomplish the desired park position of the blade.

Unfortunately wiper arms formed with a specific angled end portion can be used to replace only wiper arms having the same angled end portion. Many vehicles of different makes and models have different angled end portion requirements for their arms necessitating maintaining a large inventory of replacement arms by service stations and the like who are called upon to replace the worn out arms.

Various attempts have been made to provide adjustable connectors for different type wiper arm ends. For instance, T. J. Smulski, in U.S. Pat. No. 2,749,158, provides a serrated clutch arrangement between the end of a pantograph-type arm and a blade having a cross pin type attachment so as to provide adjustment for the angle of the blade with respect to the arm. Krohm U.S. Pat. No. 3,126,567 shows another cross pin type connector, and Reichelderfer U.S. Pat. No. 2,676,821 shows a hook saddle type connector, both provide friction-type clutch arrangements between the arm end and the connectors to adjust the angle of the blade with respect to the arm. None of these adjusting means for wiper arm ends meets the specific requirements for adjusting straight end arm extensions or tips to the plurality of positions required to meet current replacement needs.

SUMMARY OF THE PRESENT INVENTION

The present invention provides a straight end wiper arm with an extension or tip that is angularly adjustable to a wide variety of positions relative to said arm. The preferred adjusting means is a pair of mating friction plates, each plate having plural radial serrations spaced, for instance, at 4° intervals. A slot is formed in the side of each plate opposite to the serrated side. The arm end and the extension or tip are positioned in the respective slots of the friction plates with a threaded member securing the arm end, friction plates and extension or tip together. The extension or tip is angularly positioned the desired amount relative to the arm and the threaded member is screwed tight. By merely loosening the threaded member, it is possible to change the angular orientation in 4° increments, making it possible to stock one standard arm which can be used to replace a large number of original equipment arms having different angular orientations of the extension or tip relative to the main body of the arm.

BRIEF DESCRIPTION OF THE DRAWINGS

FIG. 1 is a top view showing a wiper arm and wiper blade in position on a windshield in the park position and showing the invention in use;

FIG. 2 is an enlarged broken away top view of the wiper arm extension or tip, the adjusting means and the end portion of the windshield wiper arm;

FIG. 3 is a side view of the partial windshield wiper arm shown in FIG. 2;

FIG. 4 is a plan view of the serrated face of one of the friction plates;

FIG. 5 is a cross-sectional view taken along the line 5—5 of FIG. 4;

FIG. 6 is an enlarged broken away section of the connecting surfaces between the two friction plates; and, FIG. 7 is an exploded view of the elements shown in FIGS. 2 and 3 spread apart for ease of illustration and understanding.

Referring to the drawings, wherein similar reference numerals will be used to refer to similar parts throughout the several views, a windshield wiper arm 10 is connected to a windshield wiper blade 12 which is in position on a windshield 14 in the park position along the edge 16 of the windshield.

The wiper arm 10 from its mounting head 18 to the outer arm section 20 is of conventional construction and, as shown, has, for instance, a die cast part forming the mounting head 18 which is secured to the end of an oscillating shaft (not shown) extending from the body of the vehicle. By means of the pin 22, the mounting head 18 is pivotally connected to a channel-shaped portion 24 which contains a spring and spring mounting (not shown) which serves to urge the outer end of the wiper arm 10 and the blade 12 against the windshield 14. An adjusting screw 26 is provided in this particular type of arm for adjusting the amount of tension placed on the arm for urging the blade against the windshield. Secured to the channel-shaped portion of the arm 24 is the outer arm section 20 which has at its outer end portion an aperture 28 formed transversely therethrough. An extension or tip connection end 30 of the arm 10 is angularly adjustable to the outer arm section 20 by means of the adjusting means 31 containing friction plates 32, 34 and threaded member 36. The details of the connection between the outer arm section 20 and the extension or tip connection end 30 will be described in detail hereinafter.

The extension or tip connection end 30 of the arm is provided with an upstanding lug 38 which is adapted to engage with a latching spring (not shown) in the connector 40 which is pivotally mounted on the primary yoke 42 of the windshiled wiper blade 12. The type of wiper blade used with the wiper arm 10 forms no part of this invention and the details thereof will not be described.

FIGS. 4, 5 and 6 best illustrate the construction of the friction plates 32, 34 which are identical and interchangeable. A detailed description of only one friction plate will be given but it is understood that both friction plates are the same. Friction plate 32 has a front face 44 and a rear face 46 joined together by a cylindrical wall 47. Front face 44 has a circular recess portion 48 formed centrally thereof with an aperture 50 through the central portion of said recess. The face 44 tapers radially outwardly and away from the center of the plate as is best shown in FIG. 5 and has a plurality of radially directed serrations 45 formed in said face 44. In the preferred form of the invention, it has been found that 90 serrations 45 formed in the face 44 of the plate results in each serration being spaced 4° from either adjoining serration. The rear face 46 of the plate 32 has rounded outer edges and a centrally disposed slot 52 formed diametrically across the face 46. The slot 52 intersects the aperture 50 uniformly and evenly from side-to-side.

Serrations 45 on face 44 of friction plate 34 are engaged with serrations 45 on face 44 of plate 32 so that the respective serrations 45 nest together in mating relationship as best shown in cross-section in FIG. 6. The extension or tip connection end 30 is nested in the slot 52 in the rear face 46 of plate 34 with the outer section 20 of the arm nested in the slot 52 in the rear face 46 of plate 32. The threaded member 36 is inserted through the aperture 28 in the outer section 20, through the apertures 50 in the respective friction plates 32, 34 and is threaded into the threaded opening 54 in the extension or tip connection end 30. The serrations 45 on the faces 44 of the plates 32 and 34 are skipped relative to each other until the axis of the extension or tip connection end 30 is at the proper angle with respect to the axis of the outer section 20. The threaded member 36 is then cranked down tight so as to lock the outer section 20 to the extension 30 in such a way that the two members cannot move relative to each other. In the locked position the outer section 20 and the extension 30 act as a single wiper arm member which is then connected with the connector 40 and the wiper blade 12.

The angle A between the axis of the extension or tip 30 and the axis of the outer arm 20, as shown in FIG. 2, is the arm tip park angle which by manipulating the threaded member 36 can be adjusted in 4° increments. Once the proper tip angle is established, the extension or tip 30 is locked to the outer section 20 in a positive fashion so that one cannot move relative to the other.

With the invention herein disclosed, it is possible for a service station or store to stock a single set of the adjustable tip type wiper arms and depending upon the make of the vehicle to which the arm is to be assembled, the proper park angle can be set by adjusting the two friction plates 32 and 34 relative to each other and securing them in position for use. With our invention, the service station is able to eliminate the need for stocking literally dozens of different type arms each one having a tip angled at a different angle so as to meet the many varied requirements of the many models of the many vehicles on the market.

We claim:

1. A windshield wiper arm having a straight end adapted for connection with a connector on a wiper blade, said wiper arm comprising an outer section and a tip section, a pair of friction plates mounted between the outer section and the tip section, one of said friction plates having the outer section nested in a slot in the outer surface thereof, the other friction plate having the tip section nested in a slot in the outer surface thereof, a plurality of mating serrations formed on the inner faces of the plates which serrations are adapted to nest together when the plates are brought into face-to-face engagement, a threaded member passing through the outer section through the two friction plates and into the tip section for locking the outer section to the tip section through the intermediary of the friction plates whereby the axis of the tip section can be angularly disposed with respect to the axis of the outer section.

2. A windshield wiper arm as claimed in claim 1 wherein each serration is spaced 4° from immediately adjoining serrations so that the tip can be adjusted in 4° increments relative to the outer section of the arm.

* * * * *